US 6,655,488 B2
United States Patent — Braud
Date of Patent: Dec. 2, 2003

(54) GEARBOX, PARTICULARLY FOR AUTOMOTIVE VEHICLE WITH TELESCOPIC LOAD-CARRYING ARM

(75) Inventor: Marcel-Claude Braud, Saint Herblon (FR)

(73) Assignee: Manitou BF, Ancenis (FR)

( * ) Notice: Subject to any disclaimer, the term of this patent is extended or adjusted under 35 U.S.C. 154(b) by 74 days.

(21) Appl. No.: 09/971,636

(22) Filed: Oct. 9, 2001

(65) Prior Publication Data
US 2002/0040621 A1 Apr. 11, 2002

(30) Foreign Application Priority Data
Oct. 9, 2000 (FR) .............................. 00.12861

(51) Int. Cl.[7] .............................................. B60K 17/34
(52) U.S. Cl. ................... 180/233; 180/374; 180/384; 74/665 GB
(58) Field of Search ............................. 180/233, 384, 180/364, 365, 374; 74/664, 665 R, 321, 665 GB, 665 GC, 665 H

(56) References Cited

U.S. PATENT DOCUMENTS

| 751,540 A | * | 2/1904 | McClintock ................. 74/721 |
| 1,678,411 A | * | 7/1928 | Westmoreland ............. 180/384 |
| 2,262,710 A | * | 11/1941 | Lang ........................... 475/198 |
| 4,618,022 A | * | 10/1986 | Hayashi ....................... 180/249 |
| 4,819,755 A | * | 4/1989 | Smemo et al. ............... 180/339 |
| 4,895,217 A | * | 1/1990 | Hueckler et al. ........... 180/233 |

FOREIGN PATENT DOCUMENTS

| DE | 3925409 | * | 2/1991 |
| EP | 0 656 315 | | 6/1995 |
| EP | 0 937 827 | | 8/1999 |
| FR | 2 339 509 | | 8/1977 |
| FR | 2 700 303 | | 7/1994 |
| JP | 4-78620 | * | 3/1992 |

* cited by examiner

Primary Examiner—Anne Marie Boehler
(74) Attorney, Agent, or Firm—Young & Thompson

(57) ABSTRACT

A gearbox, particularly for an automotive vehicle with a telescopic load-carrying arm, is adapted to transmit directly or indirectly the drive movement of an internal combustion motor (M) with at least one front or rear axle provided with driven wheels. This gearbox includes a casing (13) containing an angled transmission (15) arranged to transmit the movement of the output shaft (17) of the motor, to a drive shaft (9 or 10) of the front or rear axle, or both. The gearbox further comprises a power takeoff through shaft (16) arranged to drive a pump that generates hydraulic or hydrostatic energy.

8 Claims, 6 Drawing Sheets

GEARBOX, PARTICULARLY FOR AUTOMOTIVE VEHICLE WITH TELESCOPIC LOAD-CARRYING ARM

CROSS REFERENCE TO RELATED APPLICATION

This application is based on the disclosure of French application 00.12861 filed in France on Oct. 9, 2000, the entirety of which application is hereby expressly incorporated by reference.

FIELD OF THE INVENTION

The invention relates to gearboxes, particularly for automotive vehicles with telescopic load-bearing arms.

The invention also relates to an automotive vehicle with a telescopic load-bearing arm provided with a gearbox according to the invention.

BACKGROUND OF THE INVENTION

Automotive vehicles with telescopic load-bearing arms are known, produced and sold by the MANITOU BF Company in France, in which a diesel motor is oriented transversely to the longitudinal axis of the machine.

The diesel motor drives an angled transmission, of which an output drives a gearbox oriented longitudinally and disposed substantially in a central position and of which another output continuously drives a hydraulic pump upon startup of the motor.

These machines are generally satisfactory, but have a large number of mechanical members (resilient coupling, cardan transmission, angled transmission, torque converter, gearbox), of which certain ones are mounted in individual casings before being assembled together.

This technique results in a substantial size of the assembly produced and a costly fabrication of the mechanical transmission means of these machines.

SUMMARY OF THE INVENTION

The invention has for its object to overcome the drawbacks of the prior art, by providing a new gearbox, adapted particularly for new automotive vehicles with a telescopic load-carrying arm, of simple and economical construction and of reduced size.

The invention has for its object a gearbox, particularly for an automotive vehicle with a telescopic load-carrying arm, adapted to transmit directly or indirectly the drive movement of a transversely oriented internal combustion engine, to at least one front or rear axle having drive wheels, by means of at least one longitudinally oriented shaft, characterized in that the casing of the gearbox contains an angled transmission, whose transversely oriented input is adapted to be driven by a clutch means, and whose longitudinally oriented output defines a first shaft line of the gearbox.

According to other advantageous characteristics of the invention:
- the gearbox comprises moreover a through power takeoff shaft arranged to drive a pump generating hydraulic or hydrostatic energy
- the angled transmission comprises a double conical pinion: a forward drive pinion and a rear drive pinion, with at least one associated clutch,
- the gearbox is driven by a torque converter connected to the output of the internal combustion motor by constituting the first drive member from the gearbox, whilst the angled transmission is the second driving member secured to the turbine of the converter.
- the casing of the gearbox contains at least three parallel shaft lines: a first shaft line corresponding to the angled transmission, a second intermediate shaft for transmission between the first shaft line and a third shaft line, this third shaft line corresponding to the shaft (or shafts) for driving the front or rear axle (or front or rear drive axles),
- the first shaft line corresponding to the angled transmission comprises a double conical pinion engaging with a conical pinion adapted to be driven by the output shaft of the motor, and a double clutch for selectively driving a toothed forward drive wheel or a toothed rearward drive wheel, and these two toothed front and rear drive wheels engaging continuously with toothed wheels of the second intermediate transmission shaft,
- the second shaft line comprises several toothed wheels for transmission of movement imparted by the first shaft line to the corresponding toothed wheels of the third shaft line with which they are continuously in engagement,
- the corresponding toothed wheels of the third shaft line are mounted freely in rotation on the third shaft, and are adapted to drive this third shaft under the action of clutch or toothed means,
- the third shaft line moreover comprises a toothed wheel mounted securely on the third shaft and engaging with a toothed wheel disengageable from the second shaft line, so as to provide a number of forward drive speeds that is greater than the number of rearward drive speeds,
- the third shaft line comprises two shaft output adapted to drive simultaneously a front drive axle and a rear drive axle of an automotive vehicle, particularly a vehicle with a telescopic load-carrying arm.

The invention also has for its object an automotive vehicle with a telescopic load-carrying arm, of the type comprising two front and rear axles provided with wheels, and an internal combustion engine driving a gearbox.

BRIEF DESCRIPTION OF THE DRAWINGS

The invention will be better understood from the description which follows, given by way of non-limiting example, with reference to the accompanying drawings, in which.

DETAILED DESCRIPTION OF THE INVENTION

Figure 1:
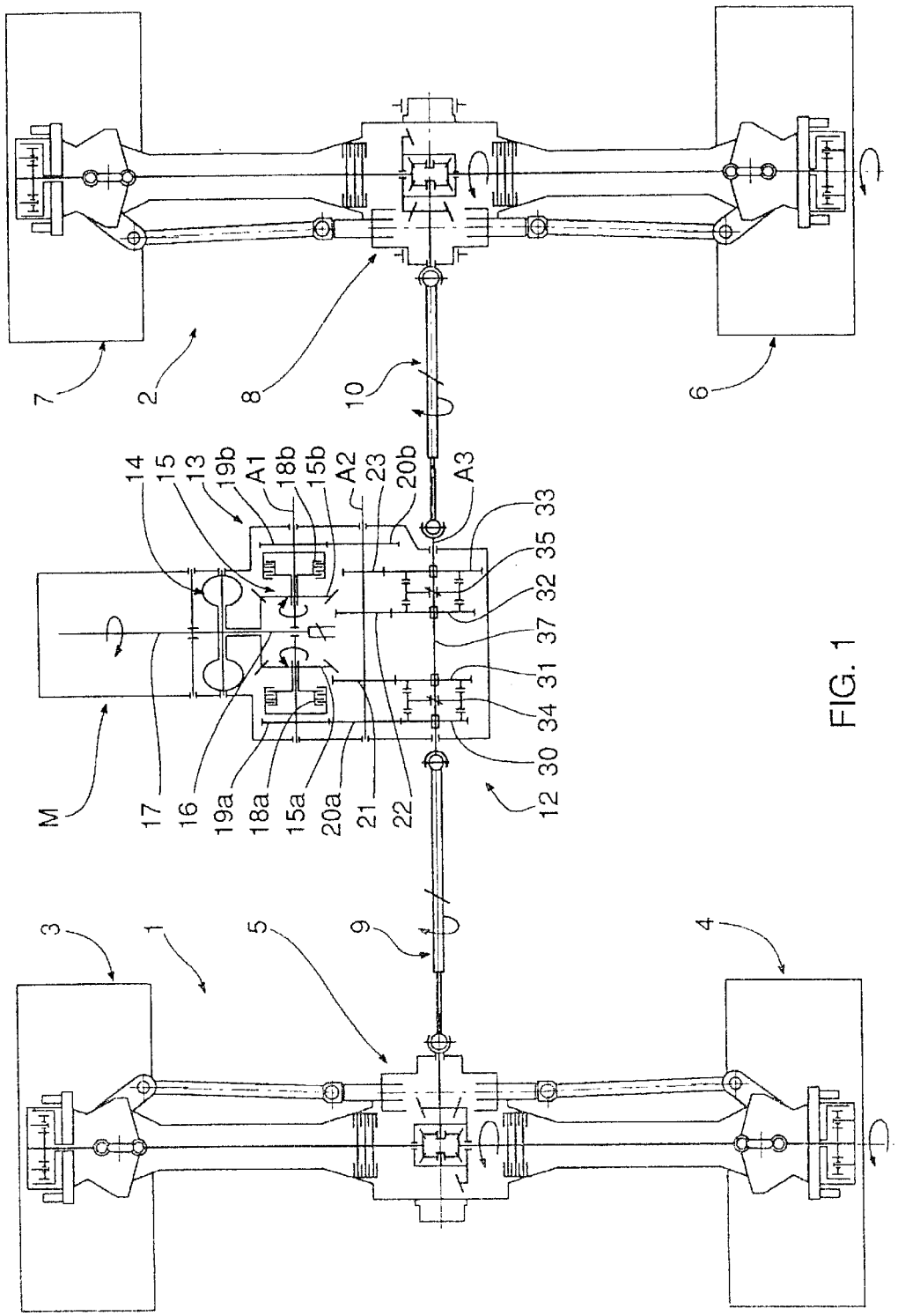
FIG. 1 shows schematically in a view from above the kinematic arrangement of one embodiment of automotive vehicle according to the invention.

Referring to FIG. 1, an embodiment of a vehicle according to the invention comprises a kinematic arrangement with a front axle 1 and a rear axle 2. Front axle 1 is a self-blocking differential axle with limited sliding, driving two front driven and steering wheels 3 and 4. The control of the front axle is a hydrostatic control with a central double-acting jack 5.

The rear axle 2 is a self-blocking differential axle with limited sliding to drive and orient two driven and steerable rear wheels 6 and 7.

The control of the rear axle is also a hydrostatic control with a central double-acting jack 8.

The drive of the front axle 1 is ensured by means of a cardan shaft 9, whilst the drive of the rear axle 2 is ensured by means of a cardan shaft 10. The cardan shafts 9 and 10 are connected to two corresponding power outputs of a gearbox 12 designed such that the cardan shafts 9 and 10 will be driven simultaneously at the same speed when the vehicle moves and such that the cardan shafts 9 and 10 will be simultaneously stopped when the vehicle is stopped.

The gearbox 12 comprises a casing 13 surrounding a torque converter 14 or equivalent clutch with a hollow shaft, adapted to drive an angled transmission 15 with a double conical pinion.

The converter 14 with a hollow shaft and the angled transmission 15 are traversed by a central shaft 16 for power takeoff, secured to the output shaft 17 of the motor M, or to the inertial flywheel of the internal combustion engine M so as continuously to drive the power takeoff shaft 16 upon starting up the motor M. The power takeoff shaft 16 is preferably adapted to drive a pump generating hydraulic or hydrostatic energy, not shown and external to the casing 13 of the gearbox 12.

Preferably, the converter 14 with a hollow shaft or equivalent clutch is connected to the output drive of the internal combustion motor M and constitutes the first member driving the gearbox 12, whilst the angled transmission 15 is the second driving member secured to the turbine of the converter 14 with a hollow shaft and integrated into the casing 13 of the gearbox 12.

The angled transmission 15 with double conical pinion comprises a forward drive pinion 15*a* with an associated clutch 18*a* and a reverse drive pinion 15*b* with an associated clutch 18*b*.

The casing 13 of the gearbox 12 contains three parallel shaft lines A1, A2, A3.

The first shaft line A1 corresponding to the angled transmission 15 comprises for forward drive: the pinion 15*a*, the associated clutch 18*a* and the toothed forward drive wheel 19*a*; and for reverse drive: the pinion 15*b*, the associated clutch 18*b* and the reverse drive toothed wheel 19*b*.

The toothed wheels for forward drive 19*a* or reverse drive 19*b* continuously engage with the toothed wheels 20*a*, 20*b* of the second intermediate shaft A2 of the transmission, which also comprises toothed wheels 21, 22, 23 fixed in rotation with the toothed wheels 20*a*, 20*b*.

Each toothed wheel 20*a* or 21 or 22 or 23 continuously engages with the toothed wheel 30 or 31 or 32 or 33 of the third shaft line A3 for driving the cardan shafts 9 and 10 of front and rear axles 1 and 2.

The toothed wheels 30 to 33 are mounted freely in rotation on the third shaft line with the possibility of engagement or equivalent synchronous drive with the crowns 34, 35 mounted securely in rotation with the third shaft line, preferably mounted on grooves on the third shaft 37 with the possibility of lateral movement under the action of mechanical controls of a type known per se and not illustrated.

The toothed engagement of a crown 34 or 35 with one of the toothed wheels 30 to 33 thus permits selecting the forward speed or rearward speed.

Figure 2:
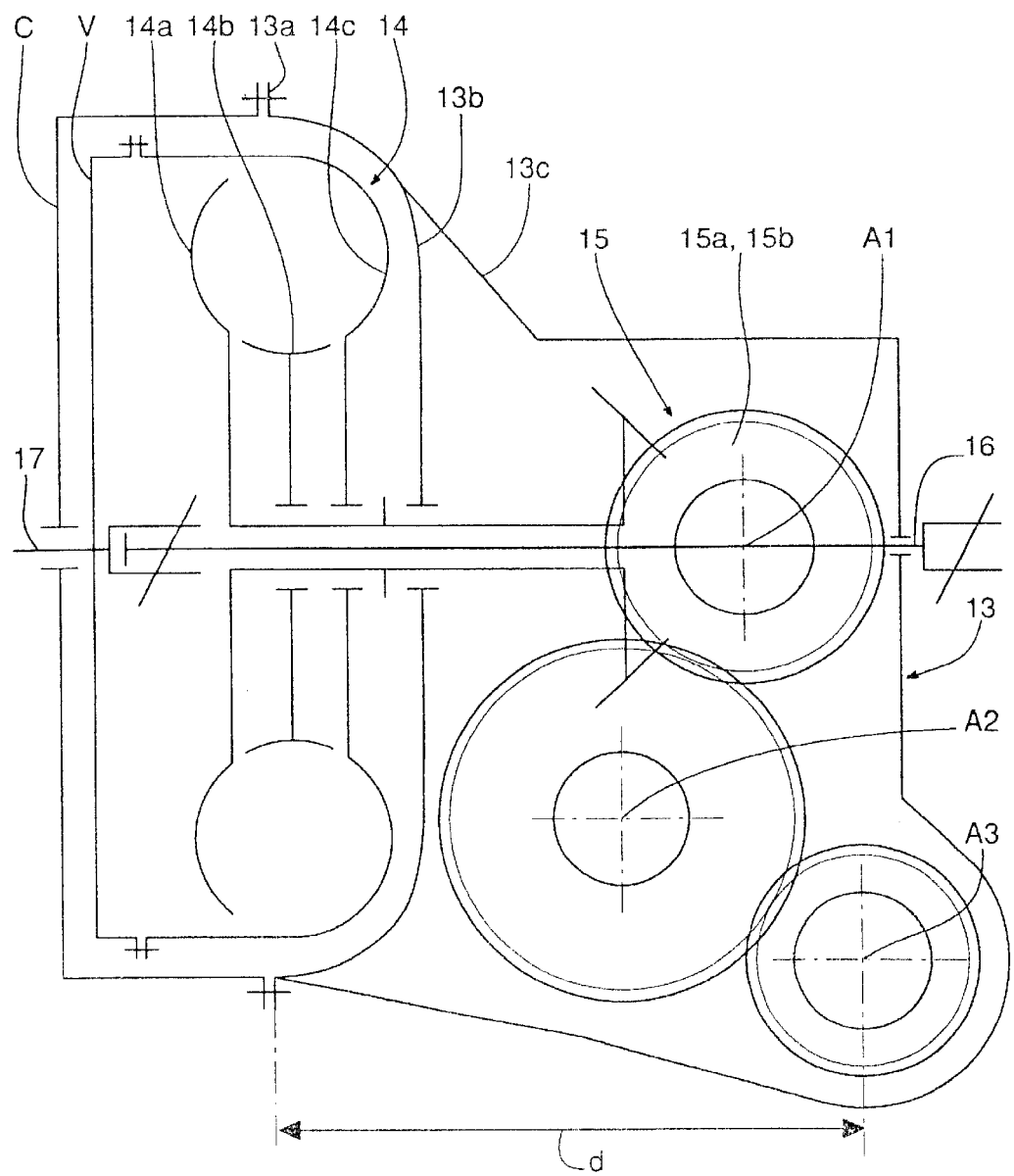
FIG. 2 shows schematically a side view of a gearbox according to the invention.
Figure 3:
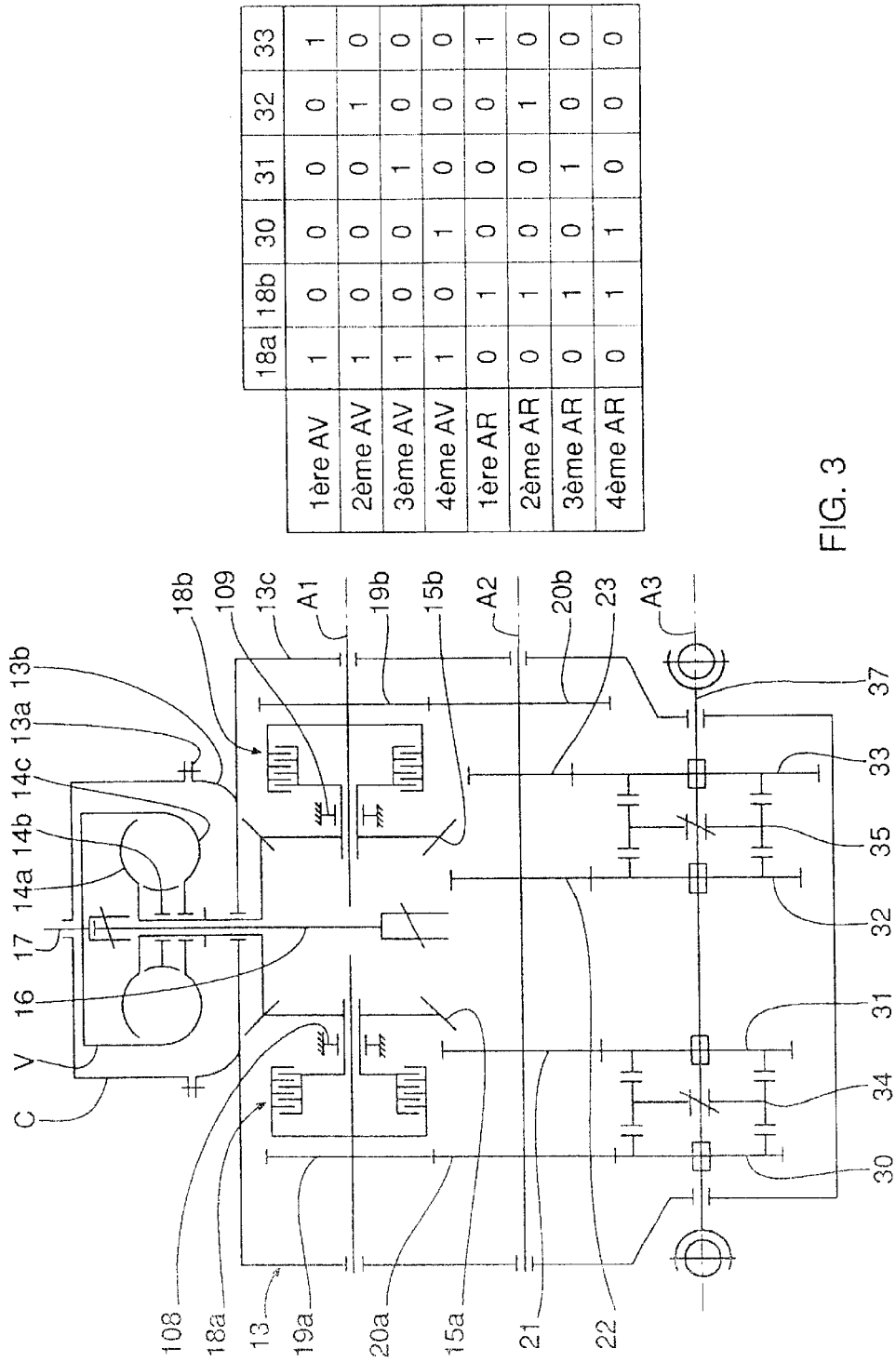
FIG. 3 shows schematically a kinematic chain of a first embodiment of gearbox according to the invention.
Figure 4:
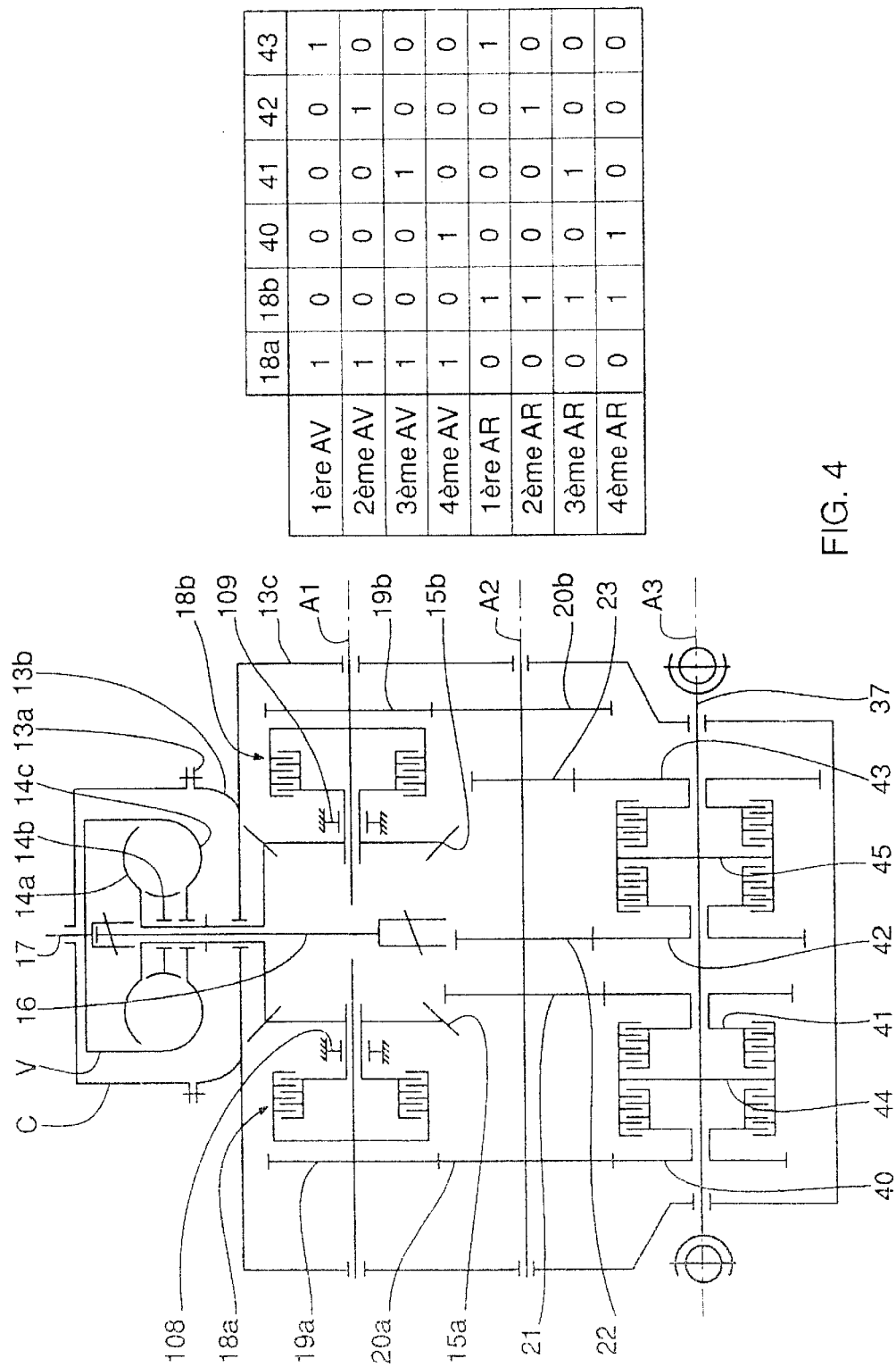
FIG. 4 shows schematically a kinematic chain of a second embodiment of gearbox according to the invention.

With reference to FIGS. 2 to 4, identical or functionally equivalent elements to FIG. 1 are indicated by the same reference numerals.

In FIG. 2, the casing 13 comprises flange 13*a* for mounting on the casing C of the flywheel V of the motor M (not shown). The converter 14 with a hollow shaft comprises a turbine 14*a* with a hollow shaft for driving the angled transmission 15, a reactor 14*b*, and an impeller 14*c* secured to the flywheel V of the motor M (not shown). The power takeoff shaft 16 is driven by the output shaft 17 of the motor M and passes between the pinions 15*a*, 15*b* to leave the casing 13 and to drive a hydraulic pump (not shown).

The three shaft lines described with reference to FIGS. 1 to 6 are schematically shown by the geometrical axes A1, A2, A3.

The reduced size of the casing 13 and of the gearbox 12 according to the invention corresponds to the mounting of the three shaft lines A1, A2, A3 on sealed bearings of known type and does not require a more detailed description.

The reduction of size in the transverse direction permits obtaining a reduced distance d between the flange 13*a* and the axis A3 of the shaft 37, preferably comprised between 200 and 500 mm and permits mounting substantially in alignment the cardan shafts 9 and 10 and the third shaft 37, thereby avoiding the addition of any intermediate transmission and any supplemental gearing.

The shaft 37 is thus preferably located, after mounting, substantially in the median longitudinal plane of the machine for which the gearbox 12 is provided.

FIG. 3 shows schematically a first embodiment of gearbox according to the invention adapted for an automotive vehicle of the type described with reference to FIG. 1, comprising reference numerals identical to the reference numerals of FIGS. 1 and 2.

In this embodiment, the casing 13 of gearbox comprises a bell 13*b* surrounding the torque converter 14 or equivalent clutch, and a sealed chamber 13*c* receiving a hydraulic liquid for lubricating the gearing and the clutches of the gearbox 12.

Bell 13*b* of casing 13 of gearbox 12 is mounted on the casing C of the motor flywheel V by its flange 13*a*.

The selection of the speed ratio results from the coaction or the reciprocal activity of the different clutch or mechanically toothed members, as indicated in the speed table in which the numeral 1 indicates the clutching activity 18*a* or 18*b*, or the drive of a crown 34 or 35 and the drive axles 1 and 2 by one of the toothed wheels 30 to 33 of the shaft 34, whilst the numeral 0 indicates the dead point of the clutch 18*a* or 18*b* or the absence of activity of a toothed wheel 30 to 33 in the free wheel condition on shaft 37.

FIG. 4 shows schematically a second embodiment of gearbox according to the invention, comprising reference numerals identical to those of FIG. 2.

This second embodiment differs from the first embodiment by the mechanical arrangement of the third shaft line A3, which comprises double clutches, permitting speed change under torque, the "power shift" transmission so called by specialists, with electrical or hydraulic control of known type and not shown in detail.

In the first and second embodiments described with reference to FIGS. 3 and 4, it is possible to select four forward speeds and four reverse speeds, to turn the shaft 37 in the corresponding regime and in the corresponding direction and to transmit its movement by cardan shafts 9 and 10 in the middle of the drive axles 1 and 2.

The selection of the speed ratio results from the coaction or reciprocal inactivity of the different mechanical clutch members, as indicated in the speed table, in which the numeral 1 indicates the clutching activity 18a or 18b or the drive by one of the clutch wheels 40 to 43 with a plate 44 or 45 of the shaft 37 and of the drive axles 1 and 2, whilst the numeral 0 indicates the dead point of the clutch 18a or 18b, or the absence of clutching of a toothed wheel 40 to 43 in the free wheel condition on shaft 37.

Figure 5:
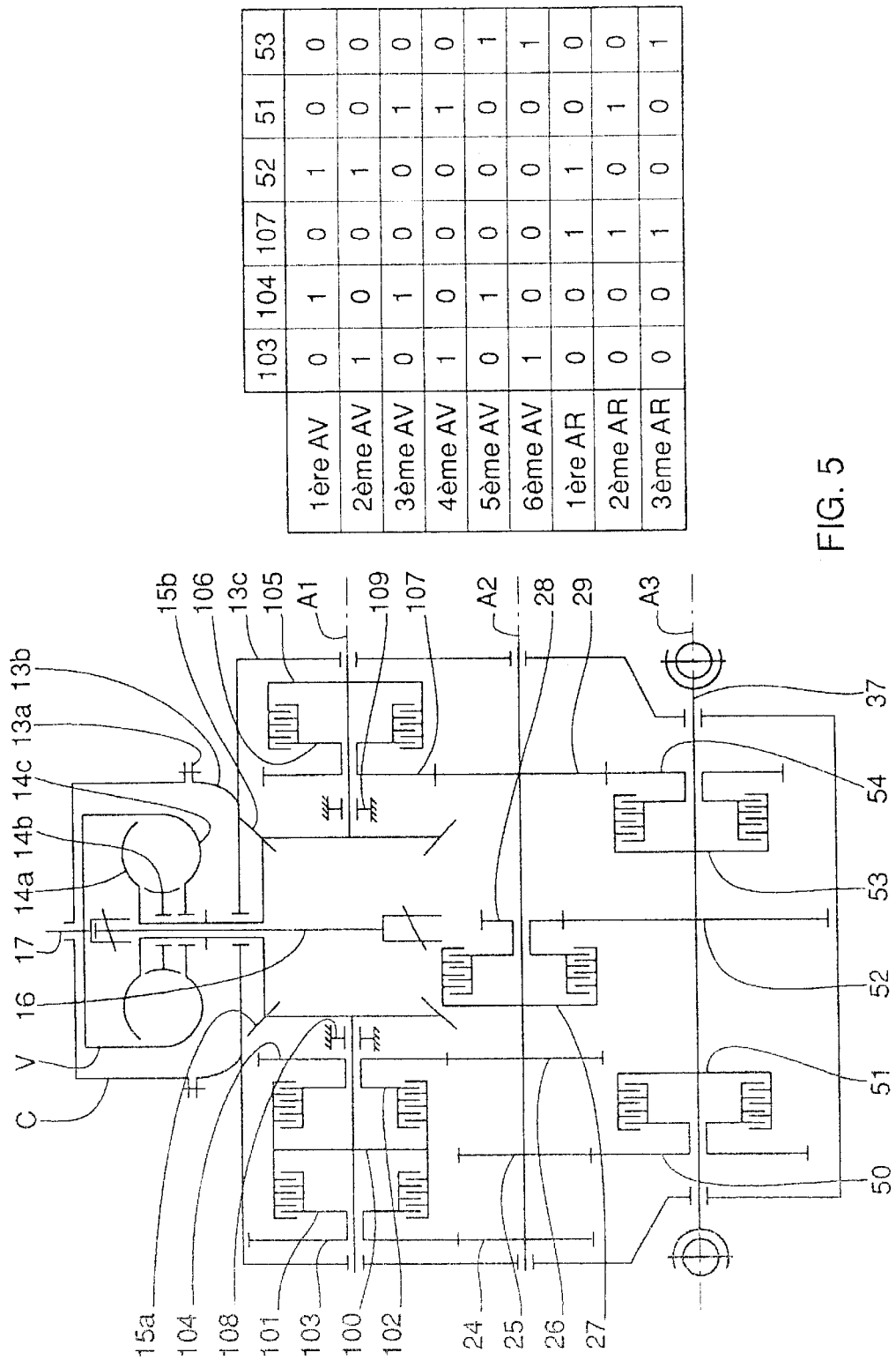
FIG. 5 represents schematically a kinematic chain of a third embodiment of gearbox according to the invention.

With reference to FIG. 5, identical or functionally equivalent elements to those of FIG. 4 are shown by the same reference numerals.

In FIG. 5, a third embodiment of gearbox according to the invention permits changing speeds under torque, the "power shift" transmission so called by specialists, by modifying the mechanical arrangements of the three shaft lines A1, A2, A3. These arrangements comprise for example intermediate support bearings 108 and 109 for the first shaft line A1 comprising the double conical pinion 15a or 15b, a double hydraulic forward drive clutch with three plates 100–101–102, and associated toothed wheels 103 and 104 secured respectively to the plates 101 and 102, and a hydraulic clutch with two plates 105–106 for reverse drive with an associated toothed wheel 107 secured to the plate 106. The toothed wheels 103, 104 and 107 of the first shaft line A1 engage continuously with the corresponding toothed wheels 24, 26 and 29 of the second shaft line A2.

A wheel 25 or 28 or 29 of the second shaft line A2 can transmit the movement of the second shaft line A2 to the third shaft 37, as a function of the force of the various clutches of the gearbox, and in particular the clutch 27–28 of the second shaft line A2.

The toothed wheels 25, 28 and 29 engage with toothed wheels 50, 52 and 54 of the third shaft 37: the first and third toothed wheels 50 and 54 are mounted disengageably and engageably under the action of clutch means 50–51 and 53–54 respectively. The second toothed wheel 52 is mounted fixedly on the shaft 37, because the toothed wheel 28 of the second shaft line A2 is disengageable.

These arrangements permit obtaining six forward speeds and three reverse speeds, as will be seen from the speed table indicating the condition of driving (1) or not (0) of one of the toothed wheels 103, 104 or 107 or of a member 51, 52 or 53 of the third shaft 37 as a function of the force of the various forward drive clutches 100–101, 100–102, or of reverse drive 105–106 and selection clutches 50–51, 27–28, 53–54 of the two shaft lines A2 and A3.

Figure 6:
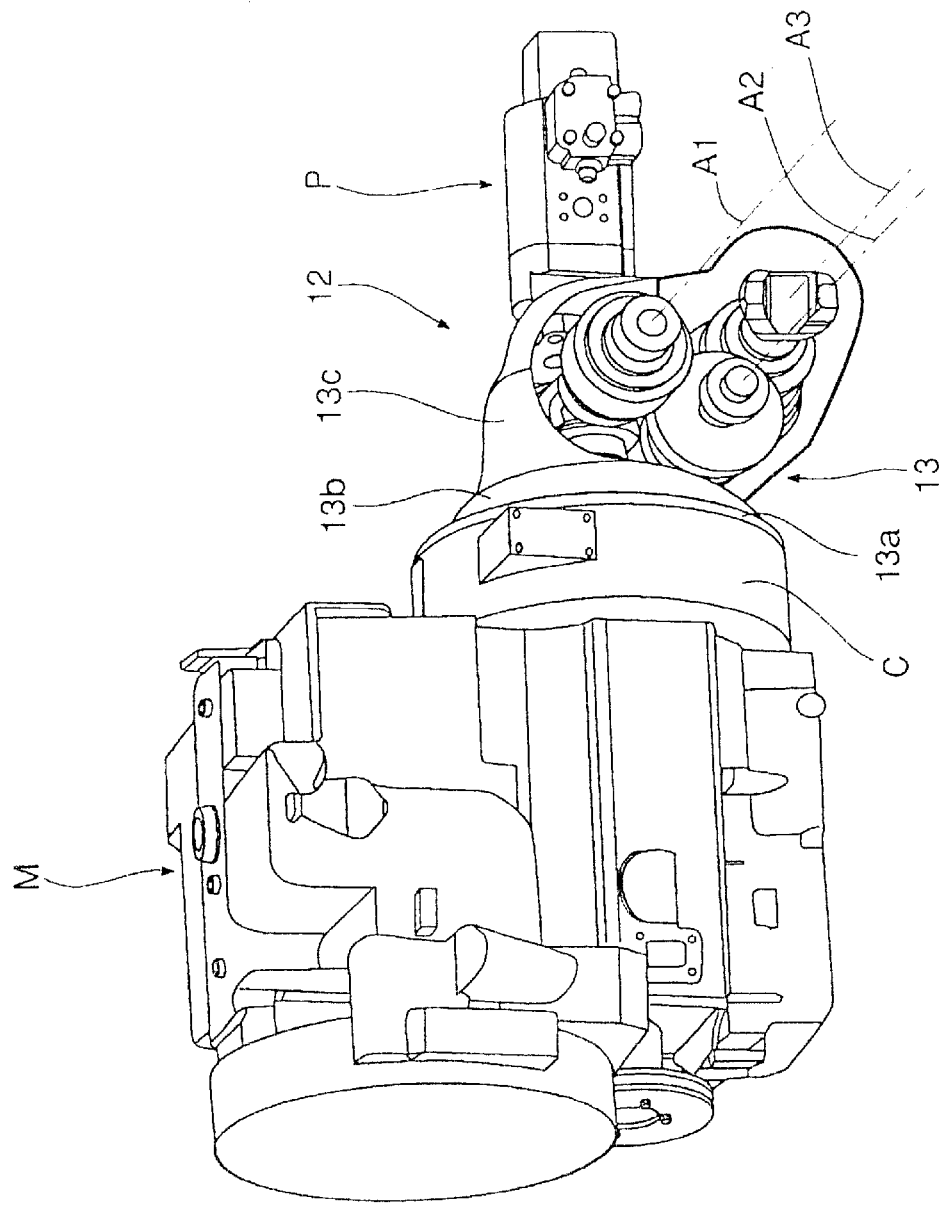
FIG. 6 shows schematically a perspective view of an assembly comprising a gearbox according to the invention shown with the casing partially broken away.

With reference to FIG. 6, an arrangement with three parallel shaft lines A1, A2, A3 of a gearbox according to the invention provides the advantage of having shaft outputs to drive the front and rear axles substantially in the desired plane (in general the longitudinal median plane of the corresponding machine), and moreover permits substantially reducing the longitudinal size of the mechanical assembly comprising the motor M and the gearbox 12.

Similarly, the passage provided through the hollow shaft of the converter 14 to transmit the movement of drive shaft 17 permits reducing the transverse size of the mounting of the hydraulic pumps P driven by the power takeoff shaft 16, such that the assembly shown comprising the motor M, the gearbox 12 and these hydraulic pumps P has a limited transverse size.

Moreover, the use of angled transmission 15 with a double conical pinion 15a, 15b supplying alternatively forward movement and reverse movement, permits having a relay shaft to reverse the direction of rotation for reverse drive.

The invention described with reference to particular embodiments is in no way thereby limited, but on the contrary covers any modification of form and all variation of embodiment within the scope and spirit of the invention.

Thus, the invention also covers any modified embodiment not shown, of a gearbox comprising at least three parallel shaft lines and arranged substantially longitudinally, having a reduced size, and of simple and economic construction. To this end, there can be used an angled transmission with a single conical pinion instead of an angled transmission with a double conical pinion described with reference to FIGS. 1 to 6, so as to reduce the longitudinal size of the gearbox by a length corresponding to the reverse drive pinion 15b, to the associated clutch 18b and to the toothed reverse drive wheel 19b. This modification to reduce the size requires providing a fourth shaft, namely a reversing shaft for reverse movement, parallel to the three shaft lines A1, A2, A3 described with reference to FIGS. 1 to 6.

This reversing shaft for reverse drive coacts disengageably with the shafts A1 and A2; when this reversing shaft is disengaged, the gear box according to the invention operates in forward drive; when this reversing shaft is engaged, the movement of shaft A1 drives the reversing shaft which in turn drives the shaft A2 and the gearbox operates in reverse drive.

The increase of the dimension of the gearbox in the transverse direction by virtue of the addition of this reversing shaft is compensated by the decrease of the longitudinal size of the gearbox, such that the volume of the casing of this modification is comparable to the volume of the casing 13 described with reference to FIGS. 5 and 6.

What is claimed is:

1. A gearbox adapted to transmit drive movement from an internal combustion motor oriented transversely, to at least one front or rear axle provided with driven wheels via at least one longitudinally oriented shaft, the gearbox comprising:

a casing that contains an angled transmission having a transversely oriented input and a longitudinally oriented output defining a first shaft line of the gearbox;

at least three parallel shaft lines comprising the first shaft line corresponding to the angled transmission, a second shaft line for transmission between the first and a third shaft line, said third shaft line corresponding to a drive shaft of a said front or rear axle;

the first shaft line corresponding to the angled transmission comprising a double conical pinion engaging with a conical portion adapted to be driven by an output shaft of the motor and a double clutch for selectively driving a toothed forward drive wheel or a toothed reverse drive wheel, said two toothed wheels engaging continuously with toothed wheels on said second intermediate transmission shaft; and a torque converter structured and arranged to drive the transversely oriented input.

2. The gearbox according to claim 1, further comprising a power takeoff through shaft that drives a pump which generates hydraulic or hydrostatic energy.

3. The gearbox according to claim 1, wherein said double conical pinion comprises a forward drive pinion and a rearward drive pinion, with at least one associated clutch.

4. The gearbox according to claim 1, wherein the second shaft line comprises several toothed wheels for transmission of movement imparted by the first shaft line to corresponding toothed wheels of the third shaft line with which said toothed wheels are continuously in engagement.

5. The gearbox according to claim 4, wherein said corresponding toothed wheels of the third shaft line are mounted freely in rotation on said third shaft, and are adapted to drive said third shaft under the action of clutch or toothed means.

6. The gearbox according to claim 5, wherein the third shaft line further comprises a toothed wheel mounted securely to the third shaft and engaging with a disengageable toothed wheel of the second shaft line, so as to provide a number of forward speeds greater than the number of reverse speeds.

7. The gearbox according to claim 6, wherein the third shaft line comprises two output shafts adapted simultaneously to drive said front and rear axles.

8. An automotive vehicle comprising a telescopic load-carrying arm, and a gearbox as claimed in claim 1.

* * * * *